United States Patent [19]

Uyama

[11] Patent Number: 5,333,534
[45] Date of Patent: Aug. 2, 1994

[54] BOOSTER

[75] Inventor: Shintaro Uyama, Saitama, Japan

[73] Assignee: Jidosha Kiki Co., Ltd., Tokyo, Japan

[21] Appl. No.: 66,896

[22] Filed: May 25, 1993

[30] Foreign Application Priority Data

Jun. 19, 1992 [JP] Japan .................. 4-185811

[51] Int. Cl.⁵ .............................. F15B 9/10
[52] U.S. Cl. ...................... 91/376 R; 92/48; 92/96
[58] Field of Search .......... 91/369.1, 376 R; 92/48, 92/49, 96, 98 R, 99, 100

[56] References Cited

U.S. PATENT DOCUMENTS

| | | |
|---|---|---|
| 3,387,540 | 6/1968 | Wilson .................. 91/376 R |
| 4,784,249 | 11/1988 | Harrison ................ 92/99 X |
| 5,105,721 | 4/1992 | Furuta et al. ........ 91/376 R X |
| 5,121,674 | 6/1992 | Uyama ................. 91/369.3 |
| 5,146,837 | 9/1992 | Inoue . | |

FOREIGN PATENT DOCUMENTS

| | | |
|---|---|---|
| 1505664 | 5/1970 | Fed. Rep. of Germany .... 91/376 R |
| 1941678 | 2/1971 | Fed. Rep. of Germany .... 91/376 R |
| 3505626 | 8/1986 | Fed. Rep. of Germany .... 91/376 R |
| 2154682 | 9/1985 | United Kingdom ............ 91/376 R |

*Primary Examiner*—Edward K. Look
*Assistant Examiner*—Hoang Nguyen
*Attorney, Agent, or Firm*—Flynn, Thiel, Boutell & Tanis

[57] ABSTRACT

A brake booster, and more particularly, an improvement of a coiled spring which is disposed within a valve body to return an input shaft to its inoperative position is disclosed. The coiled spring of the invention is generally cylindrical, and is disposed between a retainer secured to a tubular portion of the valve body and a step on the input shaft. The coiled spring includes a seat section which is disposed in abutment against the step on the input shaft and which has an inner diameter chosen to be less than the adjacent coil. Such arrangement enables an arcuate space 20d to be maintained radially between the seat section and its adjacent coil. The arcuate space is utilized as a pressure passage which allows the passage of the atmosphere. If the coiled spring is rapidly compressed upon operation of the booster, the described space is maintained, allowing an unhindered passage of the atmosphere through the space. This improves the response upon operation of the booster.

7 Claims, 4 Drawing Sheets

BOOSTER

FIELD OF THE INVENTION

The invention relates to a brake or clutch booster, and more particularly, to an improvement of a coiled spring which is disposed within a valve body to return an input shaft to its inoperative position.

DESCRIPTION OF THE PRIOR ART

A booster is known in the art including a valve body containing a valve mechanism therein and having a tubular portion formed in its rear part which provides a pressure passage, an input shaft inserted into the tubular portion for movement with the valve mechanism, and a coiled spring disposed between the tubular portion of the valve body and the input shaft for urging the input shaft rearward to return it to its inoperative position, the coiled spring including a helical body and a seat section located at the rear end of the helical body for abutment against the input shaft.

The pressure passage mentioned above is defined by a clearance between the inner peripheral surface of the tubular portion of the valve body and the outer peripheral surface of the input shaft. In a conventional booster, a conical coiled spring is used in the described arrangement, and a seat section defined by the rear end of the coiled spring is disposed for abutment against the outer peripheral portion of the input shaft. Consequently, the coiled spring necessarily extends across the pressure passage in the prior art arrangement, whereby a pressure fluid which is supplied to the valve mechanism through the pressure passage flows past the wires of the helical body of the coiled spring between the wires. However, in such an arrangement of the prior art, when the booster is operated rapidly, for example, an atmospheric valve will be opened to provide a larger opening, and consequently the degree of compression to which the coiled spring is subject increases. This means that the clearance formed between adjacent wires of the helical body of the coiled spring will be significantly reduced. This leads to an impediment to the flow of the pressure fluid which passes therebetween, with consequence that a conventional arrangement suffers from a poor response upon operation.

SUMMARY OF THE INVENTION

The invention relates to a booster including a valve body containing a valve mechanism therein and having a tubular portion formed at its rear portion which provides a pressure passage, an input shaft inserted into the tubular portion for movement together with the valve mechanism, and a coiled spring disposed between the tubular portion of the valve body and the input shaft to urge the input shaft rearward to return it to its inoperative position, the coiled spring including a helical body and a seat section located at the rear end of the helical body and disposed for abutment against the input shaft. In view of the foregoing disadvantage of the prior art, in accordance with the invention, the outer diameter of the seat of the coiled spring is chosen to be less than the inner diameter of the helical body as measured at a location immediately adjacent to the seat section on the front side thereof so that the seat section and adjacent portion of the helical body be radially spaced apart to define an arcuate space which serves as the pressure passage.

With the arrangement of the invention, a given pressure passage can be maintained by the space located between the seat section and the helical body even though the coiled spring extends across the tubular portion of the valve body and the input shaft.

As a consequence, if the booster is operated rapidly to compress the coiled spring strong enough to cause a drastic reduction in the spacing between adjacent wires of the helical body, a smooth flow of the pressure fluid can be maintained through the space mentioned above. Consequently, the response upon operation of the booster can be improved as compared with the conventional arrangement.

Above and other objects, features and advantages of the invention will become apparent from the following description of several embodiments thereof with reference to the attached drawings.

DETAILED DESCRIPTION OF EMBODIMENTS

Figure 1:
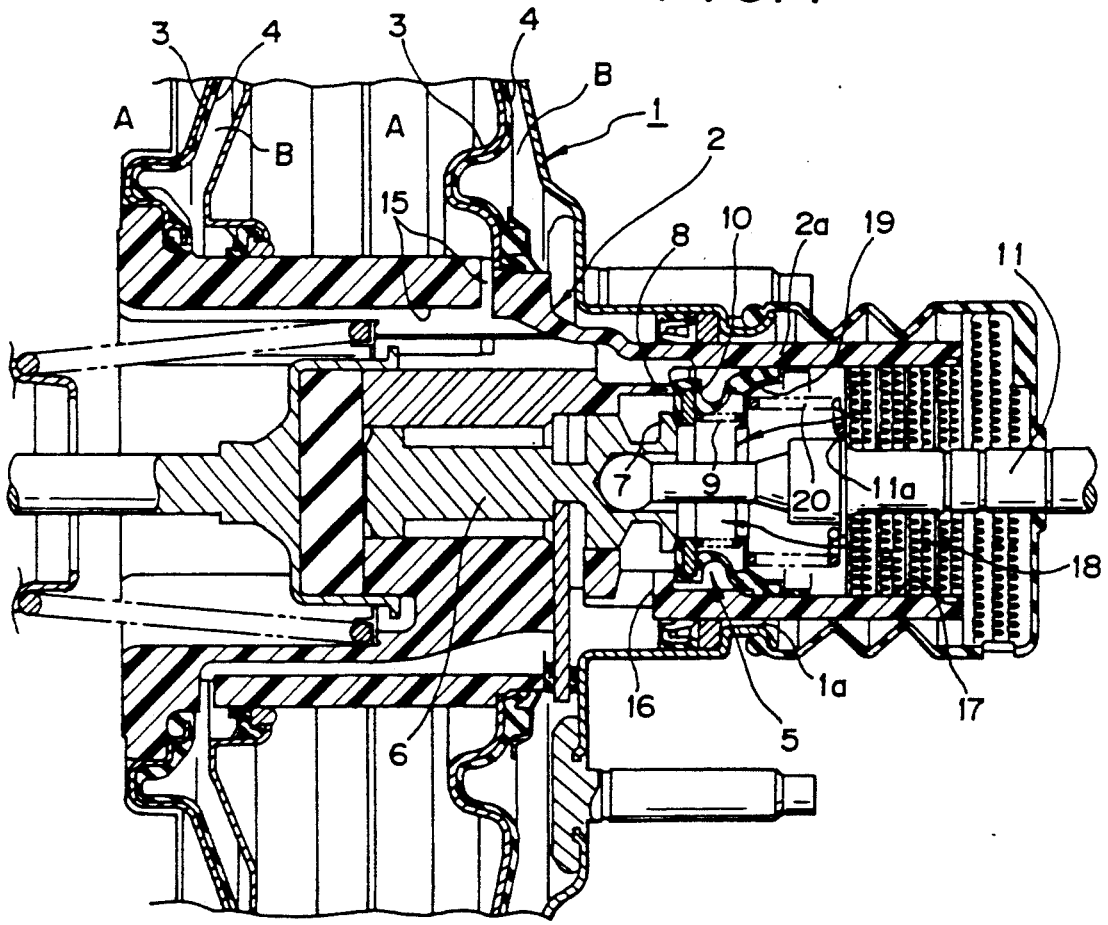
FIG. 1 is a longitudinal section of a first embodiment of the invention.

Referring to the drawings, the invention will now be described with reference to several embodiments thereof shown in the drawings. FIG. 1 illustrates an essential part of a brake booster of tandem type including a shell 1 in which a substantially tubular valve body 2 is slidably disposed. At its rear side, the valve body 2 includes a tubular portion 2a which projects to the exterior through an opening 1a formed in the shell 1. A pair of power pistons 3 are disposed around the valve body 2, and a diaphragm 4 is applied to the back surface of each power piston 3, thus defining a constant pressure chamber A and a variable pressure chamber B across each power piston 3.

A valve mechanism 5 which is known in itself is contained within the tubular portion 2a of the valve body 2, and functions to switch a fluid circuit between the constant pressure chambers A, the variable pressure chambers B and the atmosphere.

Specifically, the valve mechanism 5 comprises a valve plunger 6 slidably fitted within the valve body 2, an annular first valve seat 7 formed on the valve plunger 6, an annular, second valve seat 8 formed on the valve body 2 in surrounding relationship with the first valve seat 7, and a valve element 10 which is urged from the right, as viewed in FIG. 1, under the resilience of a first coiled spring 9, to be seated upon either valve seat 7 or 8. The right end of the valve plunger 6 is connected to an input shaft 11 which is mechanically coupled to a brake pedal, not shown, whereby the valve mechanism 5 can be operated in connection with the input shaft 11.

A space located radially outward of an area of contact between the second valve seat 8 and the valve element 10 communicates with the constant pressure chamber A through an axially extending, constant pressure passage 15 which is formed in the valve body 2, thereby normally introducing a negative pressure into the constant pressure chamber A and the constant pressure passage 15. On the other hand, a space located radially inward of an area of contact between the second valve seat 8 and the valve element 10, but radially outward of an area of contact between the first valve seat 7 and the valve element 10 communicates with the variable pressure chamber B through a radially extending, variable pressure passage 16 formed in the valve body 2.

Finally, a space located radially inward of an area of contact between the first valve seat 7 and the valve element 10 communicates with the atmosphere through a pressure passage 17 formed by a clearance between the inner peripheral surface of the tubular portion 2a of the valve body 2 and the outer peripheral surface of the input shaft 11 and through a filter 18 which is disposed to cover the pressure passage 17.

The valve element 10 is generally tubular, including an annular portion located at its left end which is adapted to be seated upon either valve seat 7 or 8 and a thickened right end which is secured against the inner peripheral surface of the tubular portion 2a by means of a stepped retainer 19. The retainer 19 substantially forms part of the tubular portion 2a. The first coiled spring 9 is disposed between the retainer 19 and the valve element 10 to urge the valve element 10 toward either valve seat 7 or 8.

A second coiled spring 20 having a greater resilience than the first coiled spring 9 is disposed across the retainer 19 and a step 11a formed around the outer periphery of the input shaft 11. The resilience of the second coiled spring 20 is effective to secure the retainer 19 against the tubular portion 2a and also to urge the input shaft 11 rearward to maintain it in its inoperative position shown.

The described arrangement remains fundamentally the same as a brake booster of tandem type known in the art.

Figure 2:
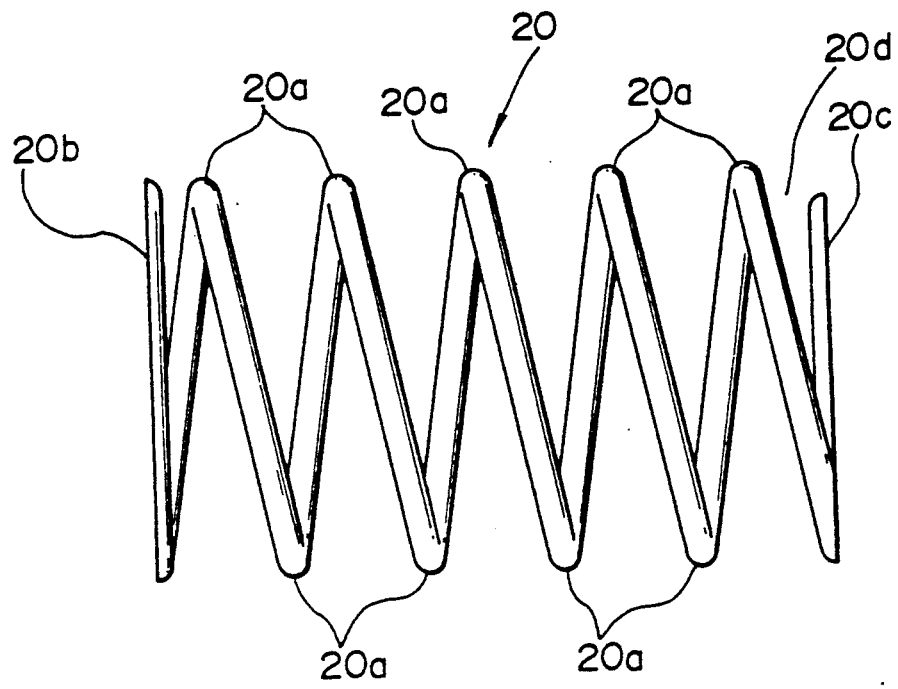
FIG. 2 is a front view of a second coiled spring shown in FIG. 1.
Figure 3:
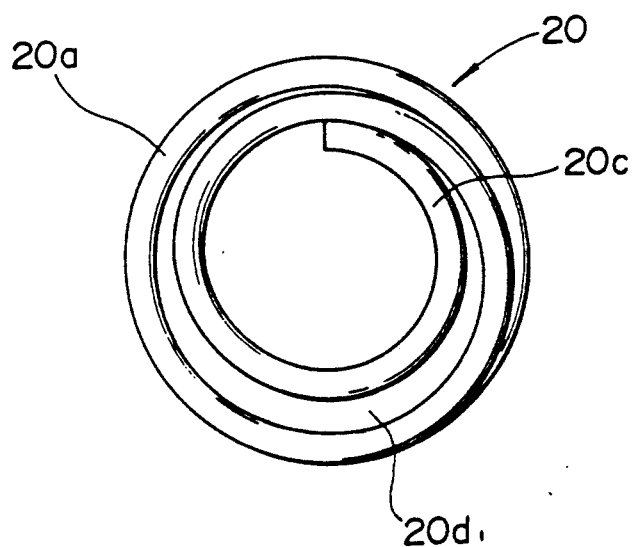
FIG. 3 is a right-hand side elevation of FIG. 2.

Referring to FIGS. 2 and 3, the second coiled spring 20 according to the embodiment is generally cylindrical, and includes a body 20a formed by a helical winding of a wire. The front end of the body 20a is formed as a first seat section 20b which abuts against the retainer 19 while the rear end of the body 20a is formed as a second seat section 20c which abuts against the step 11a on the input shaft 11.

In the present embodiment, the outer diameter of the second seat section 20c is chosen to be less than the inner diameter of the body 20a at a location immediately adjacent to and located forward of it. The second seat section 20c is formed by less than one turn of wire. As a result of the second seat portion 20c being radially spaced from its adjacent body portion 20a, an arcuate space 20d is maintained therebetween and can be utilized as the pressure passage 17 mentioned above. Accordingly, in this embodiment, if the second coiled spring 20 is subject to an extreme compression, the pressure passage 17 of a given area can be secured by the provision of the space 20d.

In the present embodiment, the first coiled spring 9 is also cylindrical in configuration, and accordingly when the atmosphere which acts as the pressure fluid passes through the pressure passage 17 within the tubular portion 2a, such flow is maintained through the space 20d in the second coiled spring 20, a space located radially inward of the second coiled spring 20 and a space located inside the first coiled spring 9, as indicated by an arrow in FIG. 1.

With the described embodiment, if the brake booster is rapidly operated as a result of driving the input shaft 11 rapidly forward, for example, to cause a sharp compression of the second coiled spring 20 to cause an extreme reduction in the spacing defined between adjacent wires of the body 20a, the space 20d mentioned above is maintained, and allows an unhindered passage of the atmosphere through the space 20d.

By contrast, in a conventional arrangement in which a simple conical spring 20 is used for the second coiled spring 20, the compression of the coil acts to impede the passage of the atmosphere, degrading the response of the brake booster.

As a consequence, the described embodiment allows the response upon operating the brake booster to be improved as compared with the prior art.

Figure 4:
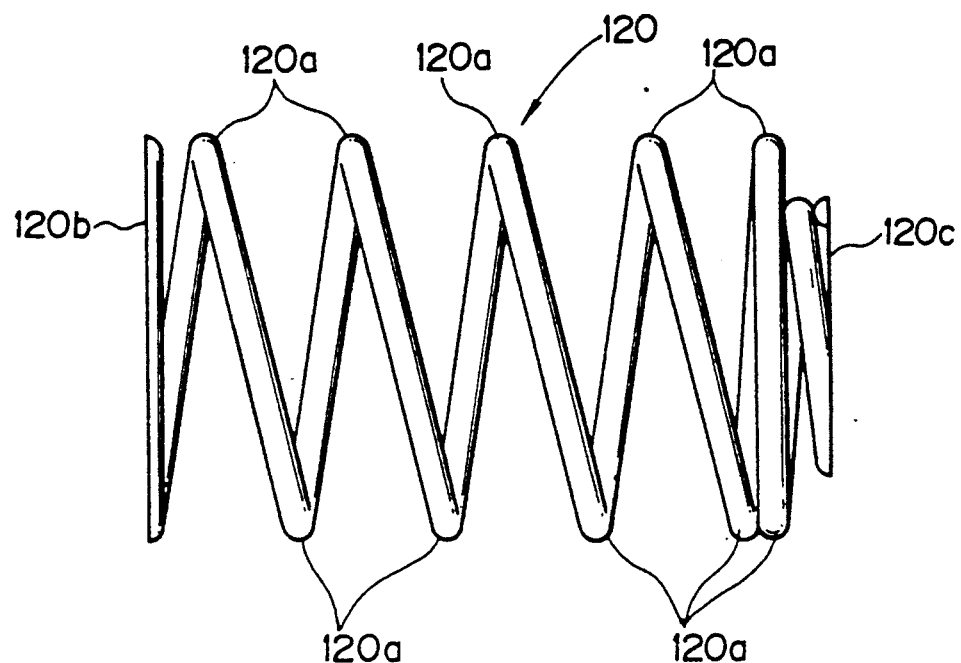
FIG. 4 is a front view of a second coiled spring according to a second embodiment of the invention.
Figure 5:
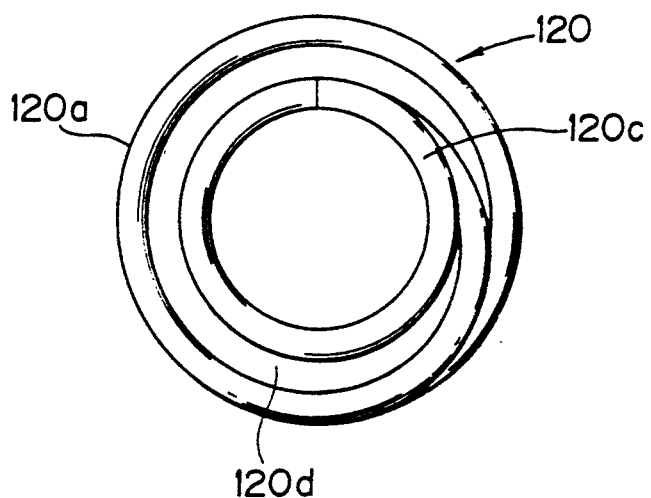
FIG. 5 is a right-hand side elevation of FIG. 4.

Second Embodiment:

FIGS. 4 and 5 show a second embodiment of the invention in which a second seat section 120c of a second coiled spring 120 has a greater winding of the wire, which is substantially more than one turn. In other respects, the arrangement is similar to those of the first embodiment described above in connection with FIGS. 2 and 3, and corresponding parts are designated by like numerals as used in FIGS. 2 and 3, to which 100 is added. The arrangement of the second embodiment functions in the same manner and achieves the same effect as the first embodiment.

Figure 6:
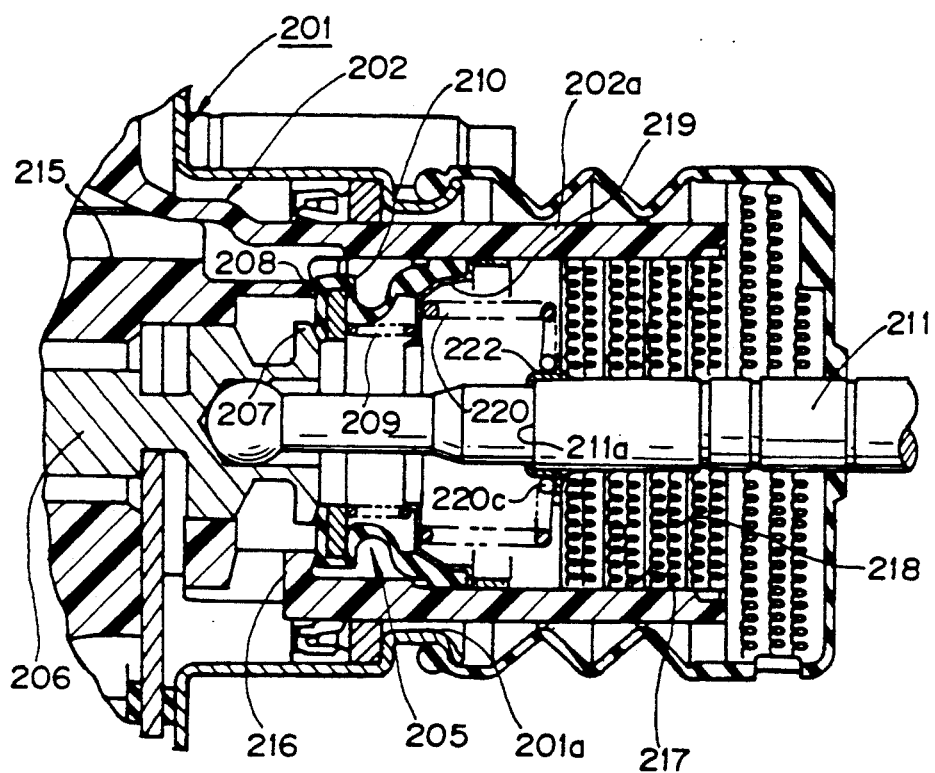
FIG. 6 is a cross section of a third embodiment of the invention.

Third Embodiment:

FIG. 6 shows third embodiment of the invention, in which an annular stop member 222 is mounted on a step 211a of an input shaft 211, and a second seat section 220c of a second spring 220 is disposed in abutment against the stop member 222. In other respects, the arrangement is similar to that of the first embodiment, and corresponding parts to those of the first embodiment are designated by like numerals as used in connection with the first embodiment, to which 200 is added. It is to be noted that the stop member 222 substantially defines part of the input shaft 211. The arrangement according to the third embodiment functions in the same manner and achieves the same effect as the first embodiment.

While the invention has been disclosed above in connection with the several embodiments thereof, it should be understood that a number of changes, modifications and substitutions therein will readily occur to one skilled in the art from the above disclosure without departing from the scope and spirit of the invention defined by the appended claims.

What is claimed is:

1. A booster including a valve body containing a valve mechanism therein and having a tubular portion formed at its rear side which provides a pressure passage, an input shaft inserted into the tubular portion for movement together with the valve mechanism, and a coiled spring disposed between the tubular portion of the valve body and the input shaft for urging the input shaft rearward to return it to its inoperative position, the coiled spring including a helical body and a seat section located at a rear end of the helical body and disposed for abutment against the input shaft; characterized in that the helical body of said coiled spring includes a constant inner diameter from the rear end to a front end thereof so as to define a generally cylindrical space from said rear end to said front end, and the seat section of said coiled spring includes an outer diameter less than the inner diameter of the helical body at a location immediately adjacent to and located forwardly of the seat section, whereby the seat section and the helical body portion are radially spaced apart to define an arcuate space therebetween which serves as the pressure passage.

2. A booster according to claim 1 in which the valve mechanism includes a valve element having a base which is connected to the tubular portion of the valve body by a stepped cylindrical retainer, the coiled spring being disposed between the retainer and a step on the input shaft which is located rearward of the retainer, a second coiled spring having a cylindrical configuration and being disposed between the retainer and a location on the valve element which is located forwardly of the retainer.

3. A booster according to claim 2 in which the helical body of said coiled spring is generally cylindrical and the seat section is formed by a winding less than one turn.

4. A booster according to claim 2 in which the helical body of said coiled spring is generally cylindrical, and the seat section is defined by a winding equal to or greater than one turn.

5. A booster according to claim 2 in which an annular stop member is mounted on the step of the input shaft, the seat section being disposed in abutment against the stop member.

6. A booster according to claim 5 in which the helical body of said coiled spring is generally cylindrical and the seat section has a winding less than one turn.

7. A booster according to claim 5 in which the helical body of said coiled spring is generally cylindrical and the seat section has a winding equal to or greater than one turn.

* * * * *